(12) United States Patent  
Komata

(10) Patent No.: US 6,524,187 B2
(45) Date of Patent: Feb. 25, 2003

(54) COMPUTER, METHOD AND RECORDING MEDIUM FOR EXECUTING GAMES USING A PRESSURE-SENSITIVE CONTROLLER

(75) Inventor: Nobuhiro Komata, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 22 days.

(21) Appl. No.: 09/758,045

(22) Filed: Jan. 10, 2001

(65) Prior Publication Data

US 2001/0008851 A1 Jul. 19, 2001

(30) Foreign Application Priority Data

Jan. 14, 2000 (JP) ........................................ 2000-040260

(51) Int. Cl.⁷ ................................................ A63F 13/00
(52) U.S. Cl. ............................ 463/37; 463/36; 345/156
(58) Field of Search ................................. 463/36, 37, 1, 463/3–4, 7–8; 345/161, 162, 184

(56) References Cited

U.S. PATENT DOCUMENTS

| | | | | |
|---|---|---|---|---|
| 4,850,591 A | * | 7/1989 | Takezawa et al. ............ | 463/37 |
| 5,510,812 A | | 4/1996 | O'Mara et al. ............... | 345/161 |
| 5,551,693 A | * | 9/1996 | Goto et al. .................. | 345/169 |
| 5,624,117 A | * | 4/1997 | Ohkubo et al. ............. | 273/148 B |
| 5,999,084 A | | 12/1999 | Armstrong ................... | 338/114 |
| 6,135,886 A | * | 10/2000 | Armstrong ................... | 463/37 |
| 6,217,444 B1 | * | 4/2001 | Kataoka et al. .............. | 434/252 |
| 6,343,991 B1 | * | 2/2002 | Armstrong ................... | 463/37 |
| 6,344,791 B1 | * | 2/2002 | Armstrong ................... | 338/114 |

FOREIGN PATENT DOCUMENTS

| | | |
|---|---|---|
| EP | 0 302 158 A2 | 2/1989 |
| EP | 0 830 881 A2 | 3/1998 |
| TW | 413779 | 12/2000 |
| WO | 97/30386 | 8/1997 |

* cited by examiner

*Primary Examiner*—Michael O'Neill
*Assistant Examiner*—Aaron L Enatsky
(74) *Attorney, Agent, or Firm*—Katten Muchin Zavis Rosenman

(57) ABSTRACT

The adjustment of hitting power or the like by pushing or continuous pushing of a simple ON/OFF switch by a user is provided by a computer which is able to execute a program that performs processing by taking as instructions an output from a controller which has a pressure-sensitive unit and a processing unit which applies force that acts on objects on a screen of the computer, depending on the output of the controller.

2 Claims, 20 Drawing Sheets

| PRESSURE-SENSING VALUE | SETTING |
|---|---|
| 0 | 0 |
| 1 | P 1 |
| 2 | P 2 |
| ⋮ | ⋮ |
| 2 5 5 | P 2 5 5 |

FIG. 2

COMPUTER, METHOD AND RECORDING MEDIUM FOR EXECUTING GAMES USING A PRESSURE-SENSITIVE CONTROLLER

FIELD OF THE INVENTION

The present invention relates to a computer method and recording medium for executing games using a pressure-sensitive controller.

BACKGROUND OF THE INVENTION

The so-called golf games, in the context of computer games, are games wherein one or more opponent players controlled by the CPU and a player character controlled by the player playing golf one after another upon a course generated within the screen of the computer. When the player uses a controller to manipulate the player character that the player controls, the character in question hits the ball with a club.

In order to create the magnitude of the hit, a circular gage is displayed and when the player pushes a button, the gage is colored in with a stipulated color at a stipulated ratio of the length and when the button is pushed by the player next, the character that the player controls hits the ball with an amount of force which depends on the ratio of the length of the colored portion to the entire length of the gage.

In the games that include this type of hitting actions, the hitting force or power is controlled by a combination of a button pushing action and some display. It is noted that there are also many games that do not control the hitting power, but rather make it constant.

Examples of games that include hitting include: pinball games (hitting the balls), pachinko games (hitting the pachinko balls), soccer games (hitting the soccer ball), baseball (hitting in batting), volleyball (hitting the volleyball) and tennis (hitting the tennis ball).

In addition, even if they do not involve hitting, there are also other games that require power such as fishing in which power is required to cast one's lure far away, for the throw-ins done in soccer games, and for shots made in basketball games, and the like.

As shown in FIG. 6A, in a golf game, the bar of the gage G extends as long as the button is pushed and when the button is released and pushed again, the player character Pc controlled by the player hits the ball Ba with the club C1 at a strength depending on the length of the bar of the gage G, and then the ball flies in the direction of the hole H.

As shown in FIG. 6B, a baseball game involves the player character Pc controlled by the player using a bat Bt to hit the ball Ba thrown by the pitcher Ec of the opposing team.

As shown in FIG. 6C, a volleyball game involves the player character Pc controlled by the player hitting a ball Ba, thus spiking the ball at the court where the characters Ec on the opposing team are.

As shown in FIG. 6D, a pachinko game involves using player operation to hit pachinko balls toward the pachinko machine.

As shown in FIG. 7A, a horseracing game involves having the player character Pc specified by the player race against other enemy characters Ec controlled by the CPU. Note that in conventional horseracing games, the racing is performed automatically, with the user participating by raising or specifying the horses.

As shown in FIG. 7B, a basketball game involves having the player character Pc throw the ball Ba toward the goal Na at the timing of the player pushing the button. As shown in FIG. 7C, a skiing game involves having the player character Pc jump from a ski jump Ja at the timing of the player pushing the button.

As specific examples, a golf game is disclosed in the publication of unexamined Japanese patent application No. JP-A-H10-063877, a volleyball game is disclosed in JP-A-H10-30517, a basketball game is disclosed in JP-A-H7-222865, a baseball game is disclosed in JP-A-H7-163755, an Olympic throwing event game is disclosed in JP-A-H10-52572, a horseracing game is disclosed in JP-A-H10-165644, a pachinko game is disclosed in JP-A-H10-165651, a soccer game is disclosed in JP-A-H10-201957 and a skiing game is disclosed in JP-A-H11-151381.

On the other hand, so-called pressure-sensitive type controllers are used as input devices for computers, and as input devices for entertainment systems represented by game machines, for example. The pressure-sensitive controller is a unit wherein, when pressure is applied with a finger of a user directly to a control element connected to a pressure-sensitive device in the controller the pushing pressure of the user is provided as an output as a pressure-sensing value. A specific example thereof is, for example, the disclosure in Japanese patent No. 2524475 of causing a character to jump in response to a pressure-sensing output.

In addition, a pressure-sensitive type controller is disclosed in the publication of examined Japanese utility model application No. JP-B-H1-40545, wherein pressure-sensitive output is provided as input to a VCO (variable control oscillator) and the output of the VCO is used for repeated fire in a game.

SUMMARY OF THE INVENTION

It is an object of the present invention to make an adjustment of hitting power or the like by pushing or continuous pushing of a simple ON/OFF switch by a user into an easier-to-use interface for users.

This and other objects of the present invention are attained by a recording medium on which is recorded a computer-readable and executable game software program that includes an element of applying force that acts on objects, which includes a program that performs processing by taking as instructions an output from a controller which has pressure-sensitive means, wherein the software program includes a processing program that applies force that acts on objects depending on the output of the controller.

A computer according to the present invention which is able to execute a game program wherein characters perform stipulated actions by taking as instructions on output from a controller which has pressure-sensitive means, comprises said controller; means for sensing a pushing pressure of a user by the pressure-sensitive means and generating a pressure-sensing output corresponding to the pushing pressure, means for comparing the point in time at which the maximum value of said pressure-sensing signal was generated with a standard timing for said stipulated actions determined in advance in the game program, and generating a time differential; and means for evaluating said stipulated action that said character had performed from the maximum value of the pressure-sensing signal and the time differential.

A computer according to the present invention which is able to execute a game program wherein characters perform stipulated actions by taking as instructions an output from a controller which has pressure-sensitive means, comprises means for sensing the pushing pressure of a user by the pressure-sensitive means and generating a pressure-sensing output corresponding to the pushing pressure, means for comparing a setting position of a character, depending on the pressure-sensing signal with a current position parameter of said character determined in advance in said game program, and determining the advance position of the character, and means for advancing the character to the advance position.

A method, using a computer, according to the present invention, which is able to execute a game program wherein characters perform stipulated actions by taking as instructions an output from a controller which has pressure-sensitive means, comprises the steps of: sensing a pushing pressure of a user by the pressure-sensitive means and generating a pressure-sensing output corresponding to the pushing pressure, comparing the point in time at which the maximum value of said pressure-sensing signal was generated with a standard timing for said stipulated actions determined in advance in the game program and generating a time differential, and evaluating a stipulated action that a respective character had performed from the maximum value of the pressure-sensing signal and the time differential.

In an embodiment, a method using a computer according to the present invention which is able to execute a game program wherein characters perform stipulated actions by taking as instructions an output from a controller which has pressure-sensitive means, comprises the steps of: sensing a pushing pressure of a user by the pressure-sensitive means and generating a pressure-sensing output corresponding to the pushing pressure, comparing the setting position of a character depending on the pressure-sensing signal with the current position parameter of said character determined in advance in the game program, and determining the advance position of said character, and advancing said character to the advance position.

BRIEF DESCRIPTION OF THE DRAWINGS

FIG. 2 shows a table for selecting settings depending on pressure-sensing values;

FIGS. 6A to 6D are diagrams showing on a screen various ball games, wherein;

FIG. 6A shows a golf game, FIG. 6B shows a baseball game, FIG. 6C shows a volleyball game and FIG. 6D shows a pachinko game;

DESCRIPTION OF THE PREFERRED EMBODIMENTS

Here follows a detailed description of the computer for executing games using a pressure-sensitive controller, a method of using same and a recording medium of the present invention, made with reference to the appended drawings.

In a controller that has a pressure-sensitive device, when the button which is the control element of the controller is pushed by a user not only is the presence of pressure-sensing output detected, for example, as the ON/OFF of a switch, but also pressure-sensing value output which depends on the pushing pressure is also obtained.

On the other hand, in software or games that use a pressure-sensing value output, various processing or actions can be entered depending on the pressure-sensing value output. In this embodiment, even when causing objects on the screen to perform actions by operating a control element, it is possible to change the settings of parameters depending on the pressure-sensing values based on the pushing-pressure operation of various control elements.

With the present embodiment, in games that include hitting, throwing, jumping and other elements, settings are provided depending on the pressure-sensing value output from the pressure-sensitive switch at the time of the best hit, throw or jump timing. Thereby, it is possible to provide a system with a user interface that is improved in comparison to the repetition of the ON action of a simple ON/OFF switch or the duration thereof.

Figure 1:
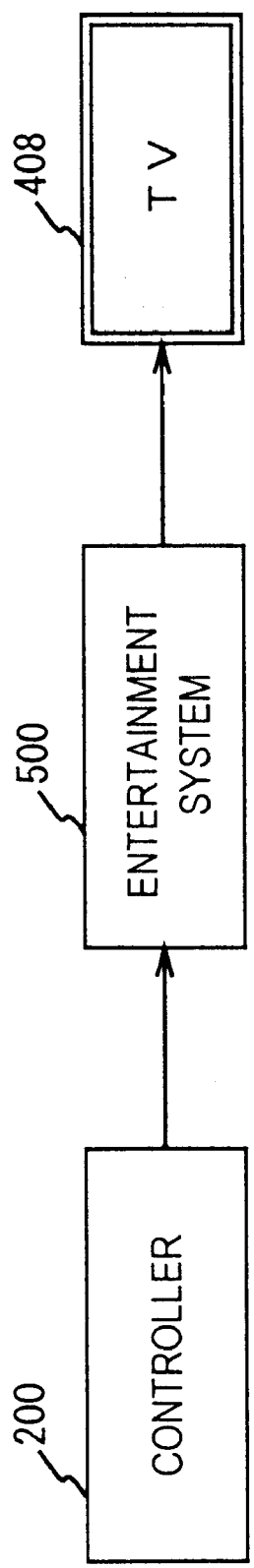
FIG. 1 diagrammatically shows the connection of a controller to an entertainment system in order to enable a user to enjoy game software or videos.
Figure 8:
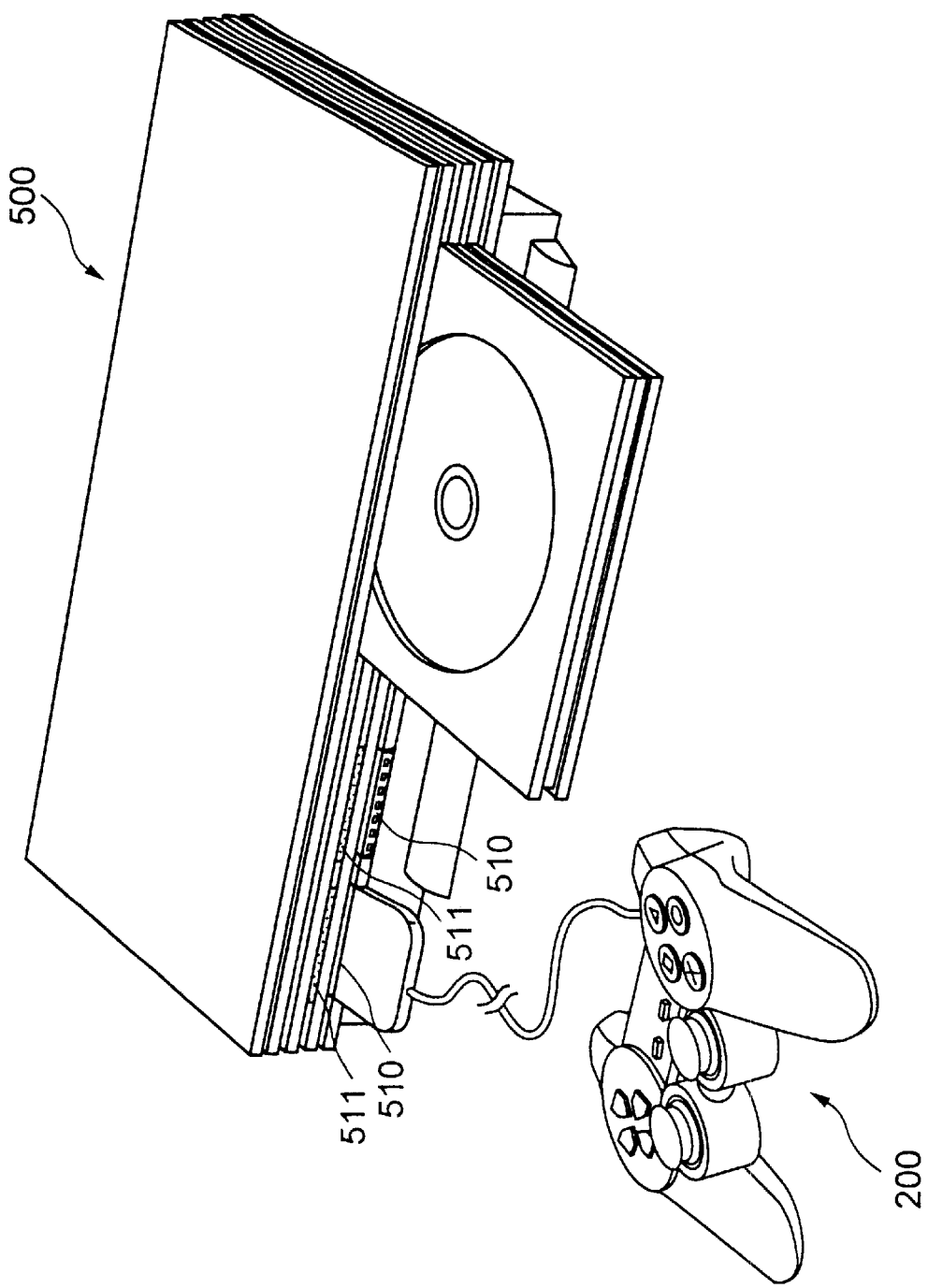
FIG. 8 is a perspective view of a controller connected to the entertainment system.

FIG. 1 is a schematic diagram showing an example of connecting controller 200 to an entertainment system 500 to enable a user of the game to enjoy game software or video. More specific structure is shown in FIG. 8.

As shown in FIG. 1, controller 200 which has buttons connected to pressure-sensitive devices of the controller is connected to entertainment system 500 used for playing games or enjoying DVD video or other types of video images, and the video output terminals are connected to a television monitor 408. Here, the analog output from the pressure-sensitive devices is converted by an A/D converter to digital values in the range 0–255 and provided to the entertainment system 500.

With reference to FIGS. 2–7, here follows a description of the case of performing hitting, throwing, jumping and the like by the operation of the controller 200 and reflecting same on the screen.

FIG. 2 shows a table for selecting settings corresponding to the pressure-sensing values. As shown in this table, the pressure-sensing values "0" through "255" are allocated to the settings "0", "P1" through "P255", respectively. Here a setting value corresponding to the pressure-sensing value is determined dependent on the contents, degree of progress and the like in game.

Next, with reference to FIG. 3, the method of performing hitting, throwing, jumping or the like based on pressure-sensing values will be described. The flowchart shown in FIG. 3 shows the processing of a program for performing hitting, throwing, jumping or the like based on pressure-sensing values.

Figure 3:
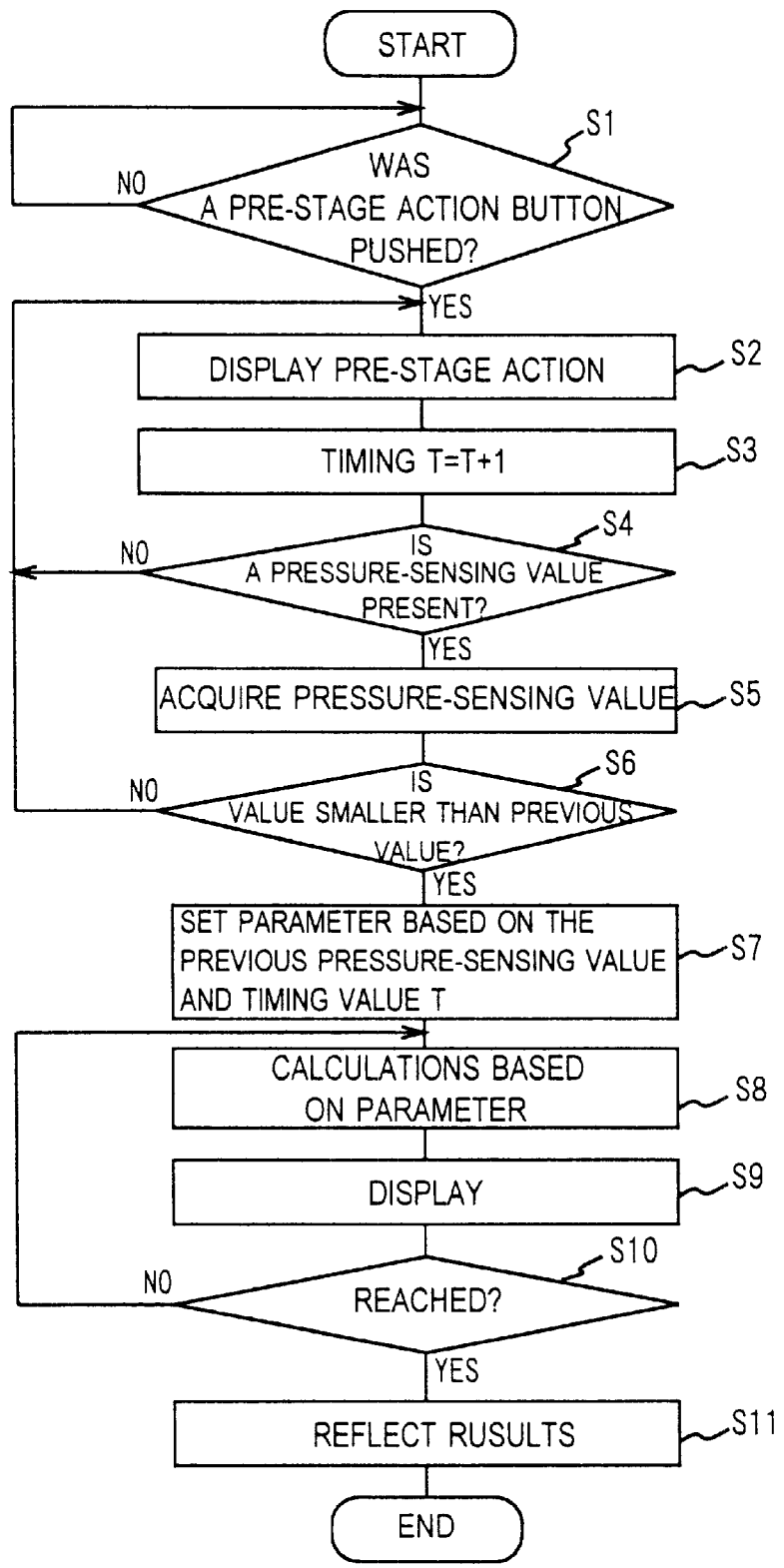
FIG. 3 is a flowchart of the processing of a program for performing hitting, throwing, jumping or the like actions, depending on pressure-sensing values of a first embodiment.

In FIG. 3, in Step S1, a decision is made as to whether or not a pre-stage action button was pressed, and if "YES" then in Step S2 the pre-stage action is displayed. Here, the pre-stage action is, in a golf game (see FIG. 6A), equivalent to animation showing the take-back of the club Ba by the player character Pc, or in a baseball game (see FIG. 6B), equivalent to animation showing the player character Pc with the bat Bt in a ready stance, or in a volleyball game (see FIG. 6C), equivalent to animation showing the player character Pc jumping and swinging for the spike, or in a pachinko game, equivalent to animation showing a hitting member being moved toward the ball Ba, or in a basketball game (see FIG. 7B), equivalent to animation showing the player character Pc jumping and getting ready to shoot, or in a skiing game (see FIG. 7C), equivalent to animation showing the player character Pc skiing down the ski jump. While watching the aforementioned animation, the player tries to push the pressure-sensitive button at the point of impact, or namely just the right timing, to obtain the maximum pressure-sensing value.

In Step S3, the timing variable T is incremented by "1" and in Step S4, a decision is made as to whether or not a pressure-sensing value is present, and if "YES" then control procedure moves to Step S5, but if "NO" then control procedure moves back to Step S2.

In Step S5, the pressure-sensing value is acquired, and in Step S6, a decision is made as to whether or not the pressure-sensing value thus acquired is less than the previous value, and if "YES" then control processing moves to Step S7, but if "NO" then control procedure moves back to Step S2.

This decision in Step S6 is intended to detect if the finger of the user has released the pressure-sensitive switch or if it has lost strength. This is used as a decision as to whether or not to end the process of acquiring the pressure-sensing value from the pressure-sensitive switch.

In Step S7, a parameter based on the value of the previous pressure-sensing value and the value of the timing variable T is set. Here, the "previous pressure-sensing value" is defined to be, when the pressure-sensing value is determined to be smaller than the previous pressure-sensing value in Step S6, the previous pressure-sensing value of that pressure-sensing value, so it is the maximum pressure-sensing value when the player had pushed the pressure-sensitive switch. The timing when this maximum value was input is the impact timing that the player was aiming at. The best timing value is set differently in the various games, and it corresponds to the length of the swing or other pre-stage action in the individual games.

Moreover, the value of the timing variable T is compared against the standard timing value to determine how far the value of the timing variable T is offset from the standard timing value, and detect whether it is smaller or larger. Depending on this differential, a stipulated value is subtracted from or added to the maximum pressure-sensing value acquired, and the setting is found from the table shown in FIG. 2 based on the modified pressure-sensing value obtained as a result.

Assuming that the standard timing value is ST, the timing variable is T, the maximum pressure-sensing value is $P_{Max}$ and the stipulated value is M, the modified pressure-sensing value $P_{Modify}$ is found as follows:

$M = |ST - T| \times k$ (k: a constant value)

$P_{Modify} = P_{Max} - M$

In Step S8, calculation is performed depending on the settings. In a golf game (see FIG. 6A), the flight distance of the ball Ba one frame later for example is calculated depending on the setting, or in a baseball game (see FIG. 6B), the flight distance of the ball Ba one frame later for example is calculated depending on the setting, or in a volleyball game (see FIG. 6C), the dropping position and dropping velocity of the volleyball Ba for example are calculated depending on the angle, or in a pachinko game, the flight distance of the pachinko ball Ba and the dropping position one frame later for example are calculated, or in a basketball game (see FIG. 7B), the trajectory and flight distance of the basketball Ba one frame later for example are calculated, or in a skiing game (see FIG. 7C), the trajectory and flight distance of the player character Pc one frame later for example are found.

In Step S9, based on the aforementioned calculations, the appearance of the ball Ba or player character Pc flying through the air is displayed, and in Step S10, a decision is made as to whether or not the target has been reached, namely whether or not the ball Ba or character Pc has landed, and if "YES" then control procedure moves to Step S11, but if "NO" then control moves back to Step S8. Note that it is also possible for all positions until the target is reached or the object lands to be found by calculation in Step S8, and then the images are displayed sequentially.

In Step S11, the results are reflected in the form of an image display or score increase or the like. For example, in a basketball game, an image showing a goal and an increased score is shown.

As described above, with the present embodiment, hitting, throwing, jumping or the like is performed depending on the pressure-sensing value, so the game enjoyment can be increased and the user interface can be improved compared to the case of hitting, throwing, jumping or the like with a simple ON/OFF switch.

It is noted that it is also possible to allocate a small setting to a high pressure-sensing value, and a large setting to a low pressure-sensing value.

In addition, in a soccer game or the like, the aforementioned flow can also be used in taking shots, for example. Namely, the kicking action of a player taking a shot can be displayed as animation, and the distance of the ball is calculated depending on the strength with which the pressure-sensitive switch is pushed. In addition, even in games other than those given above, this is completely applicable to any game that includes hitting, throwing, jumping or any other sort of shooting process.

Next, with reference to FIGS. 4 and 5, a second embodiment will be described. In the second embodiment, a horseracing game will be described. In this example, the horse specified by a player is made to run by the continuous pushing of the player's own pressure-sensitive switch. The position of the horse changes depending on the pressure-sensing value at the time of each push, and the winner is the one whose horse gets to the finish line before the horses of the opponents.

Figure 4:
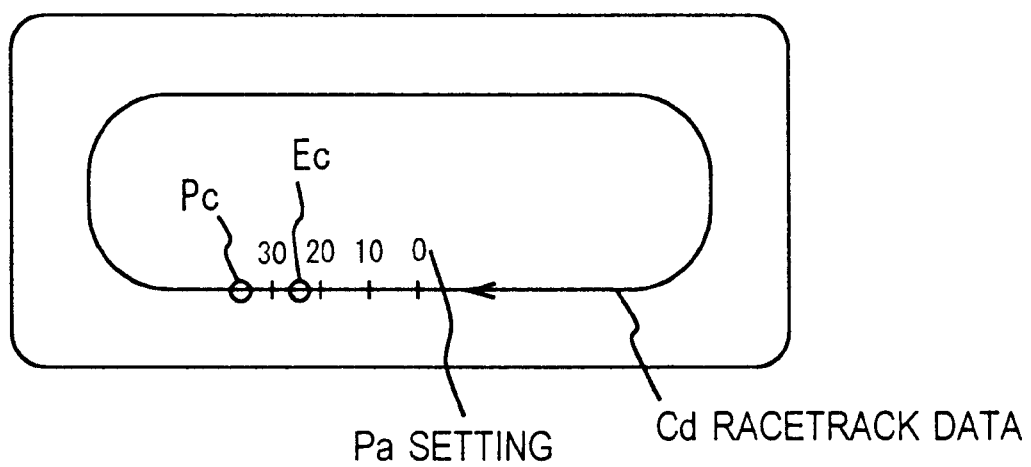
FIG. 4 is a diagram used to show a horseracing game.

As shown in FIG. 4, racetrack data Cd is read from disc in advance and stored in the entertainment system 500. This racetrack data Cd consists of a large number of settings Pa which indicate positions on the racetrack. For simplicity in explanation, the racetrack is shown as in this figure, but actually, it is a table in which is recorded a large amount of racetrack position data, with pointers which indicate the horse acting as the player character (hereinafter, simply referred to as the "player character") Pc and the competitor's horse Ec placed at racetrack position data corresponding to the state of the race. Then, images corresponding to the state of this table are generated and displayed for each frame.

Figure 5:
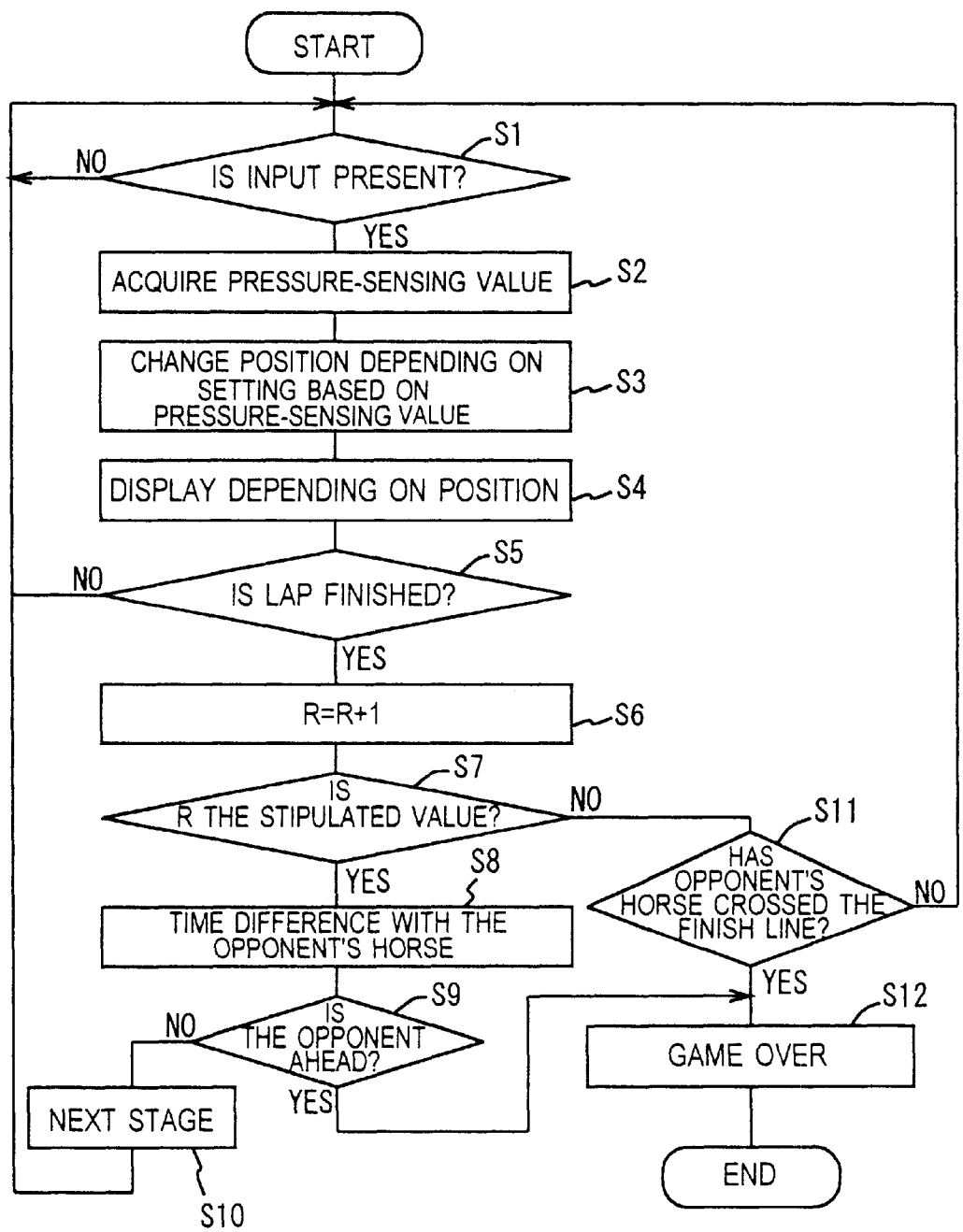
FIG. 5 is a flowchart illustrating the program for a horseracing game according to a second embodiment.
Figure 6A:
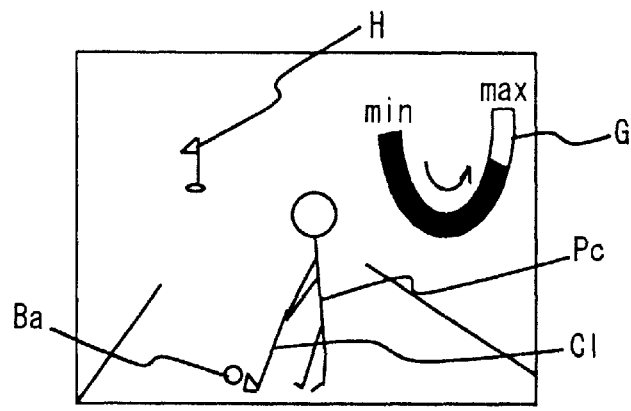
Figure 6B:
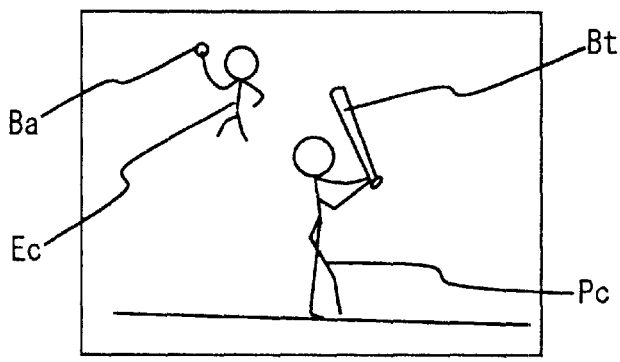
Figure 6C:
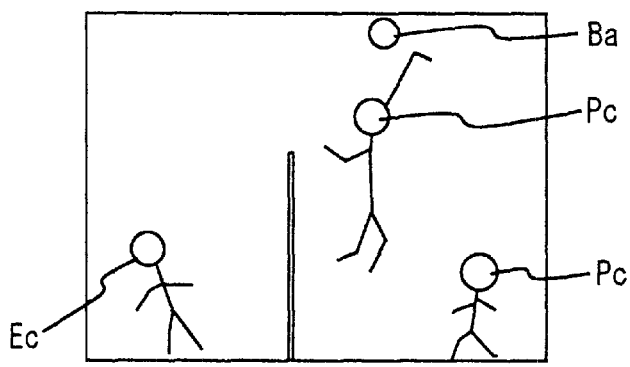
Figure 6D:
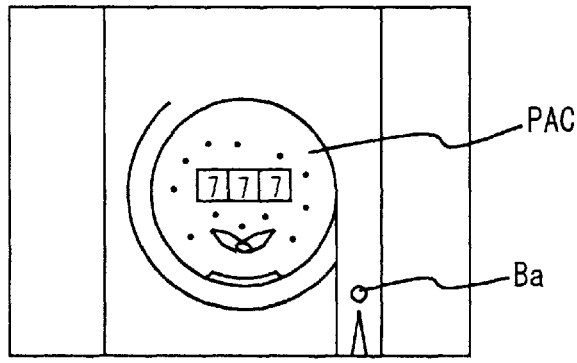
Figure 7A:
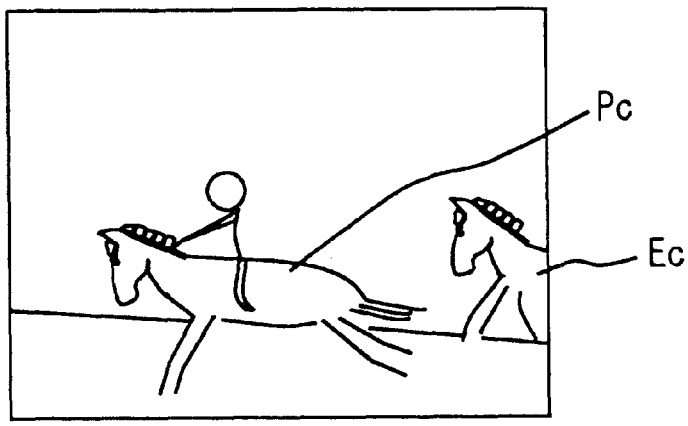
FIGS. 7A to 7C show on a screen a horseracing game in FIG. 7A, a basketball game in FIG. 7B and a skiing game in FIG. 7C, respectively.
Figure 7B:
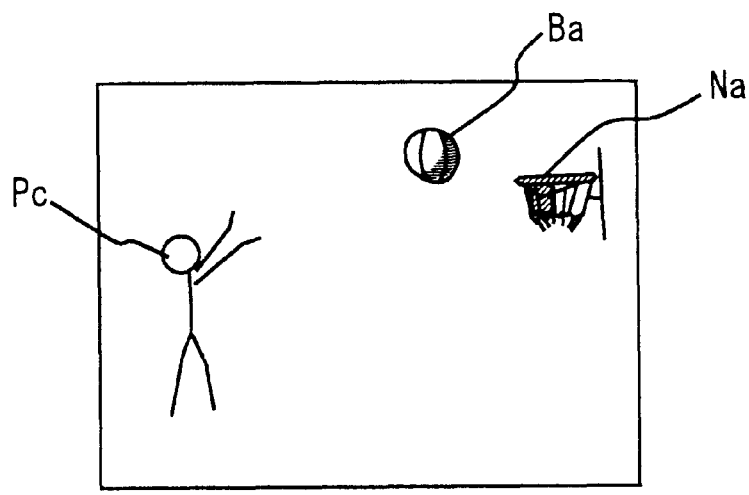
Figure 7C:
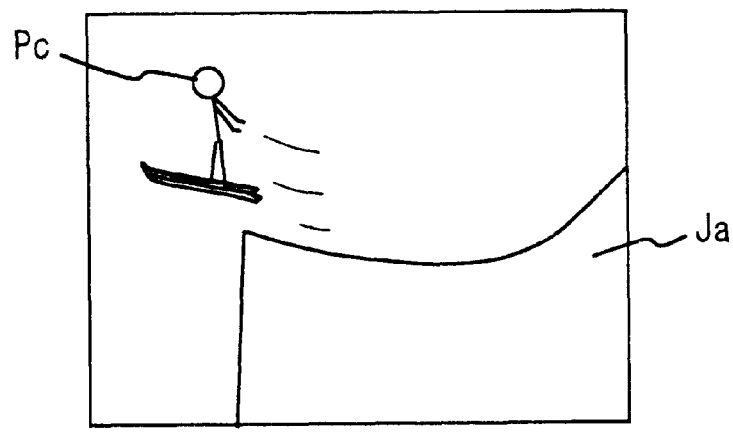

The processing of the aforementioned horseracing game is shown in FIG. 5 which is a flowchart showing the program for the horseracing game.

In Step S1, a decision is made as to whether or not input is present, and if "YES" then control moves to Step S2, where a pressure-sensing value is acquired in Step S2. In Step S3, the setting "P1", . . . , "255" is selected from the table shown in FIG. 2 based on the pressure-sensing value thus acquired, and the pointer for the player character Pc is placed at the racetrack position data indicated by that setting.

Here, the setting indicates the racetrack position data. For example, when the value of the racetrack position data indicating the current position of the player character Pc is "10" then if the setting is "10" then the pointer to the updated player character Pc will be placed at the racetrack position data of "20".

In Step S4, an image depending on the aforementioned racetrack position data is displayed. It is noted that trees and grass on the racetrack and the like are stored as polygon data corresponding to the racetrack position data, so these are rendered and displayed.

In Step S5, a decision is made as to whether or not one lap has been completed, and if "YES" then the control procedure moves to Step S6, but if "NO" then control moves back to Step S1. The decision of whether or not a lap has been completed is made based on whether or not the current racetrack position data is greater than the maximum value of the racetrack position data.

In Step S6, the variable R is incremented by "1" and in Step S7 a decision is made as to whether or not R is a stipulated value, and if "YES" then control procedure moves to Step S8, but if "NO" then control procedure moves to Step S11. Here, the stipulated value is a predetermined number of laps and if this is determined to be 5 laps, for example, then the victory in the race is determined when one of the horses has completed 5 laps.

In Step S8, the time difference with the opponent's horse is found, and in Step S9, a decision is made as to whether the opponent is first, and if "YES" then procedure control moves to Step S12, but if "NO" then control procedure moves to Step S10.

In Step S10, control moves to the next stage, namely the next race. In Step S11, a decision is made as to whether or not the opponent's horse has passed the finish line, and if "YES" then control procedure moves to Step S12, but if "NO" then control procedure moves back to Step S1.

In Step S12, a game over results and processing ends.

In this horseracing game, the horse controlled by the player runs at a speed that depends on the number of times per unit of time that the player pushes the pressure-sensitive switch and the pressure-sensing value at that time, so it is possible to provide a game that offers more of a feeling of being at a real race than the conventional horseracing games wherein the player enters in a race a horse s/he has trained, and the race occurs automatically depending on various parameters in that race.

FIG. 8 is a diagram showing controller 200 connected to entertainment system 500. The controller 200 is removably connected to the entertainment system 500, and the entertainment system 500 is connected to television monitor 408.

The entertainment system 500 reads the program for a computer game from recording medium on which that program is recorded and by executing the program displays characters on the television monitor 408. The entertainment system 500 has various built-in functions for DVD (Digital Versatile Disc) playback, CDDA (compact disc digital audio) playback and the like. The signals from the controller 200 are also processed as one of the aforementioned control functions within the entertainment system 500, and the content thereof may be reflected in the movement of characters and the like, on the television monitor 408.

While this depends also on the content of the computer game program, controller 200 may be allocated functions for moving the characters displayed on the television monitor 408 in the directions up, down, left or right.

Figure 9:
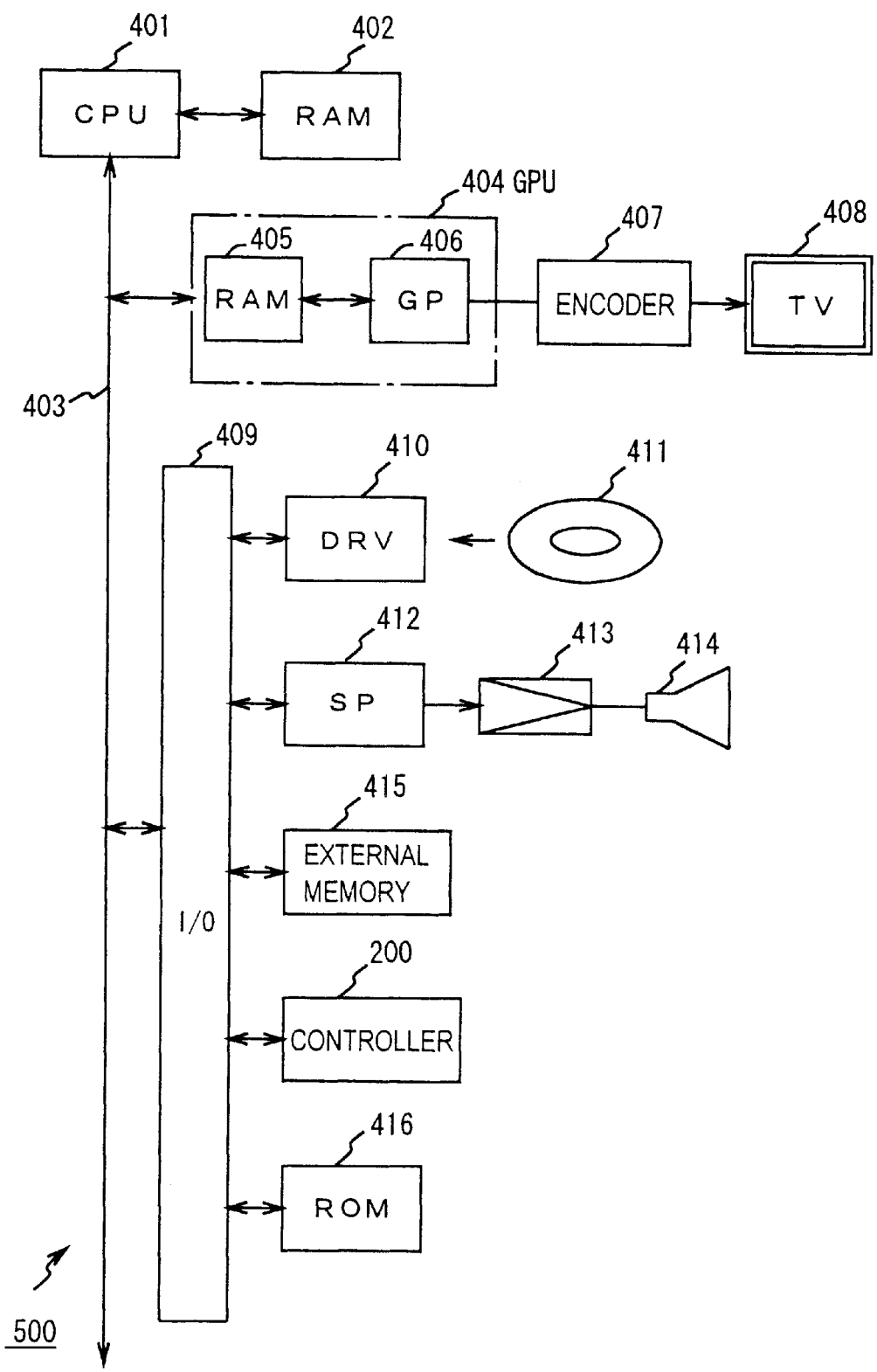
FIG. 9 is a block diagram of the entertainment system.

With reference to FIG. 9, here follows a description of the interior of the entertainment system 500 shown in FIG. 8. FIG. 9 is a block diagram of the entertainment system 500.

A CPU 401 is connected to RAM 402 and a bus 403, respectively. Connected to bus 403 are a graphics processor unit (GPU) 404 and an input/output processor (I/O) 409, respectively. The GPU 404 is connected via an encoder 407 for converting a digital RGB signal or the like into the NTSC standard television format, for example, to a television monitor (TV) 408 as a peripheral.

Connected to the I/O 409 are a driver (DRV) 410 used for the playback and decoding of data recorded upon an optical disc 411, a sound processor (SP) 412, an external memory 415 consisting of flash memory, controller 200 and a ROM 416 which records the operating system and the like. The SP 412 is connected via an amplifier 413 to a speaker 414 as a peripheral.

Here, the external memory 415 may be a card-type memory consisting of a CPU or a gate array and flash memory, which is removably connected via a connector 511 to the entertainment system 500 shown in FIG. 8. The controller 200 is configured such that, when a plurality of buttons provided thereupon are pushed by a user, the controller gives instructions to the entertainment system 500. In addition, the driver 410 is provided with a decoder for decoding images encoded based upon the MPEG standard.

The description will be made now as to how the images will be displayed on the television monitor 408 based on the operation of controller 200. It is assumed that data for objects consisting of polygon vertex data, texture data and the like recorded on the optical disc 411 is read by the driver 410 and stored in the RAM 402 of the CPU 401.

When instructions from the player via controller 200 are provided as an input to the entertainment system 500, the CPU 401 calculates the three-dimensional position and orientation of objects with respect to the point of view based on these instructions. Thereby, the polygon vertex data for objects defined by X, Y, Z coordinate values are modified variously. The modified polygon vertex data is subjected to perspective conversion processing and converted into two-dimensional coordinate data.

The regions specified by two-dimensional coordinates are so-called polygons. The converted coordinate data, Z data and texture data are supplied to the GPU 404. Based on this converted coordinate data, Z data and texture data, the GPU 404 performs the drawing process by writing texture data sequentially into the RAM 405. One frame of image data upon which the drawing process is completed, is encoded by the encoder 407 and then supplied to the television monitor 408 and displayed on its screen as an image.

Figure 10:
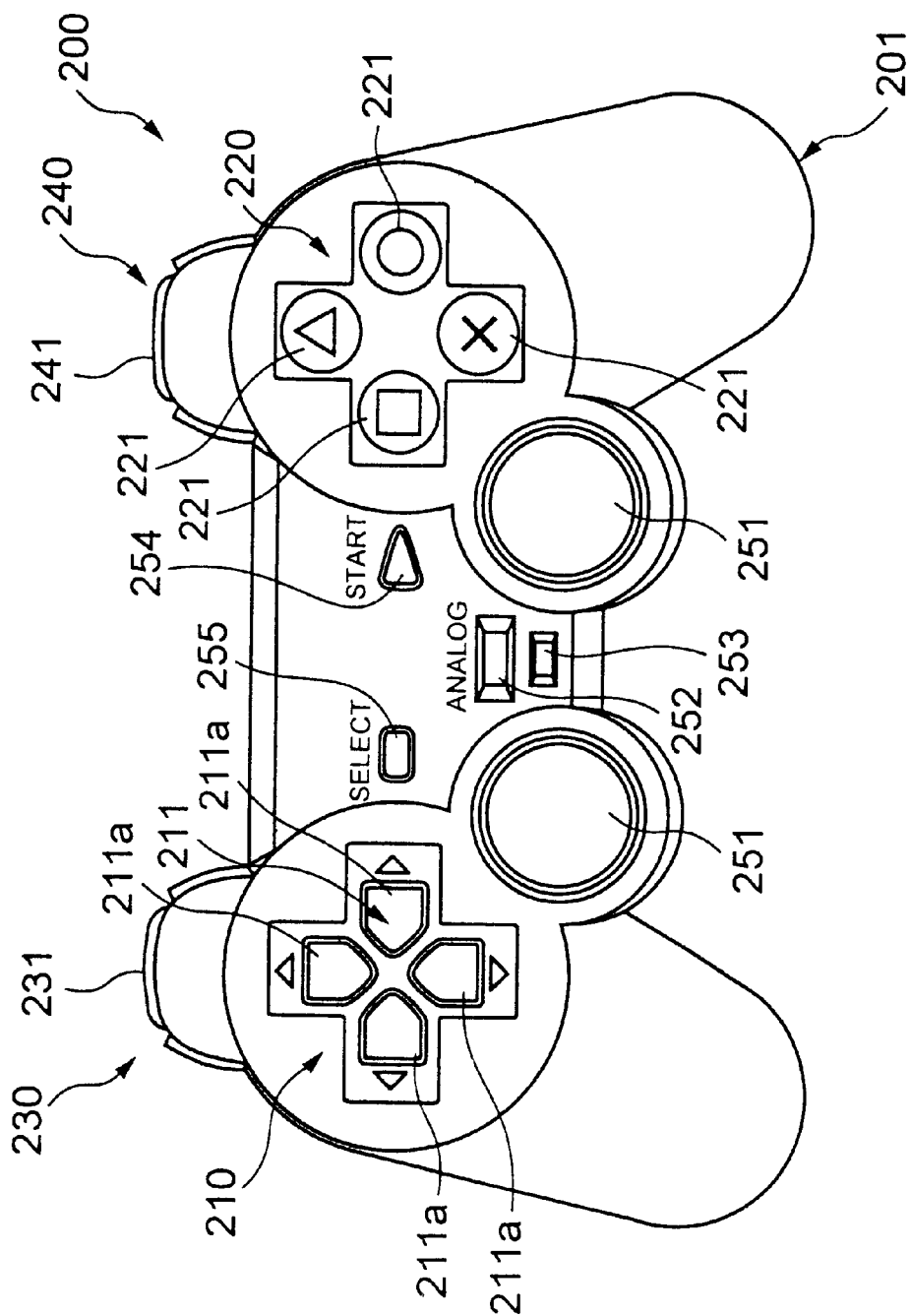
FIG. 10 is a top view of a controller.

FIG. 10 is a top view of controller 200. The controller 200 consists of a unit body 201 on the top surface of which are provided first and second control parts 210 and 220, and on the side surface of which are provided third and fourth control parts 230 and 240 of the controller 200.

The first control part 210 of the controller is provided with a cruciform control unit 211 used for pushing control, and the individual control keys 211a extending in each of the four directions of the control unit 211 form a control element. The first control part 210 is the control part for providing movement to the characters displayed on the screen of the television receiver, and has the functions for moving the characters in the up, down, left and right directions by pressing the individual control keys 211a of the cruciform control unit 211.

The second control part 220 is provided with four cylindrical control buttons 221 (control elements) for pushing control. The individual control buttons 221 have identifying marks such as "○" (circle), "×" (cross), "Δ" (triangle) and "≡" (quadrangle) on their tops, in order to easily identify the individual control buttons 221. The functions of the second control part 220 are set by the game program recorded upon the optical disc 411, and the individual control buttons 221 may be allocated functions that change the state of the game characters, for example. For example, the control buttons 221 may be allocated functions for moving the left arm, right arm, left leg and right leg of the character.

The third and fourth control parts 230 and 240 of the controller have nearly the same structure, and both are provided with two control buttons 231 and 241 (control elements) for pushing control, arranged above and below. The functions of these third and fourth control parts 230 and 240 are also set by the game program recorded on the optical disc, and may be allocated functions for making the game characters perform special actions, for example.

Moreover, two joy sticks 251 for performing analog operation are provided upon the unit body 201 shown in FIG. 8. The joy sticks 251 can be switched and used instead of the first and second control parts 210 and 220 described above. This switching is performed by means of an analog selection switch 252 provided upon the unit body 201. When the joy sticks 251 are selected, a display lamp 253 provided on the unit body 201 lights, indicating the state wherein the joy sticks 251 are selected.

It is to be noted that on unit body 201 there are also provided a start switch 254 for starting the game and a select switch 255 for selecting the degree of difficulty or the like at the start of a game, and the like.

The controller 200 is held by the left hand and the right hand of the user and is operated by the other fingers of the user, and in particular the user's thumbs are able to operate most of the buttons on the top surface.

FIG. 11 and FIGS. 12A–12C are respectively, an exploded perspective view and cross-sectional views showing the second control part of the controller.

Figure 11:
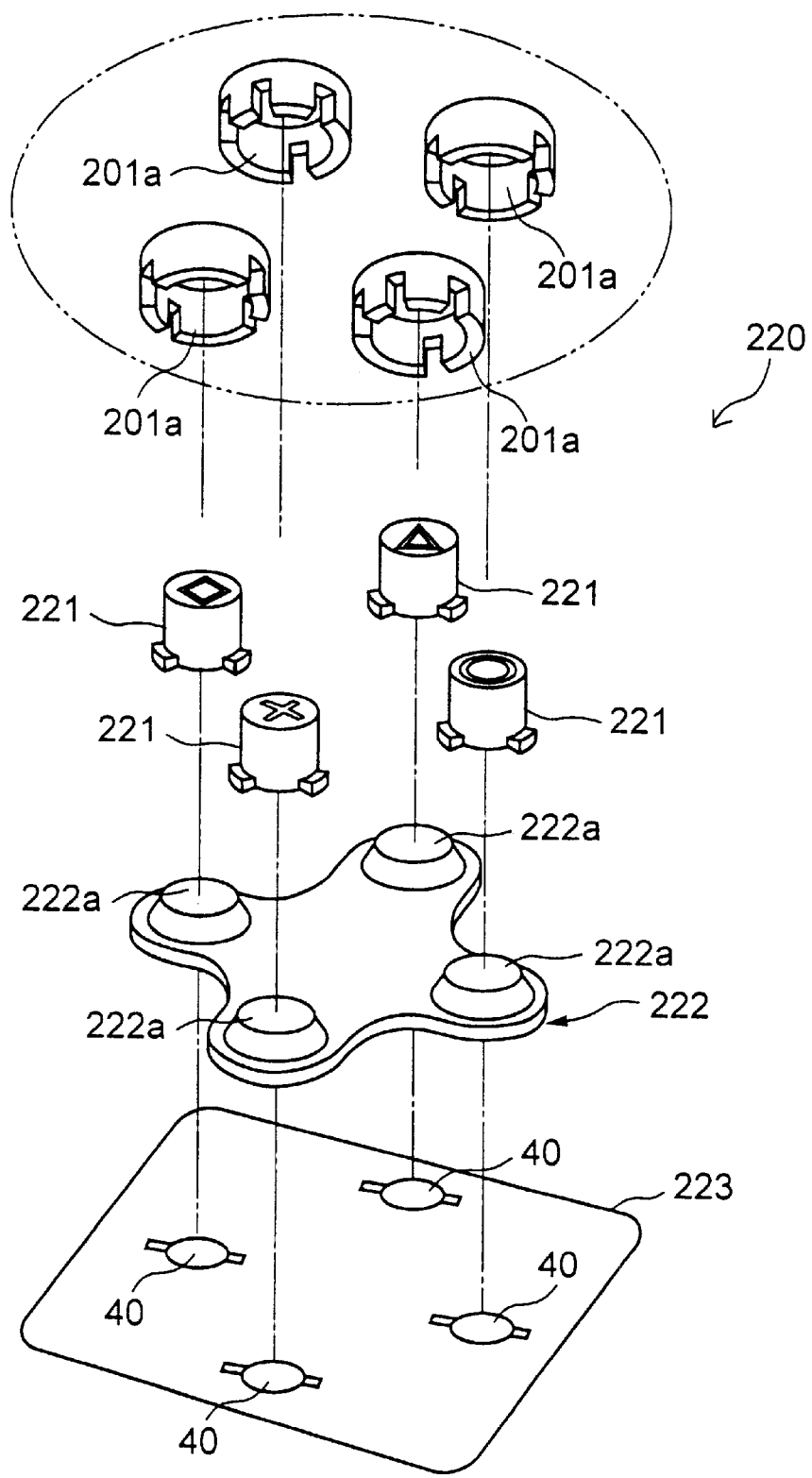
FIG. 11 is an exploded perspective view of the second control part of the controller.

As shown in FIG. 11, the second control part 220 consists of four control buttons 221 which serve as the control elements, an elastic body 222, and a sheet member 223 provided with resistors 40. The individual control buttons 221 are inserted from behind through insertion holes 201a formed on the upper surface of the unit body 201. The control buttons 221 inserted into the insertion holes 201a are able to move freely in the axial direction.

Figure 12A:
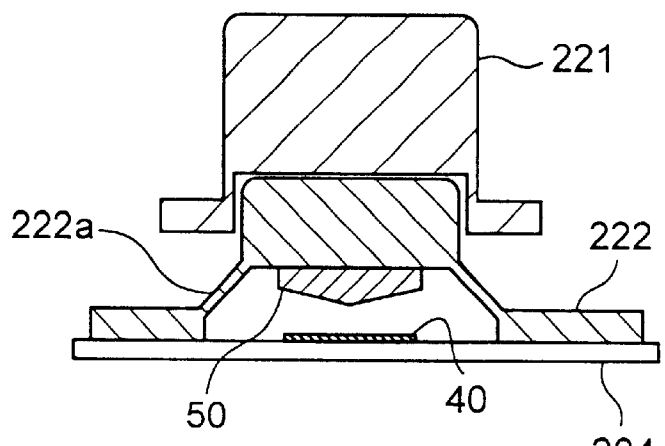
FIGS. 12A–12C are cross-sectional views of the second control part of FIG. 11.
Figure 12B:
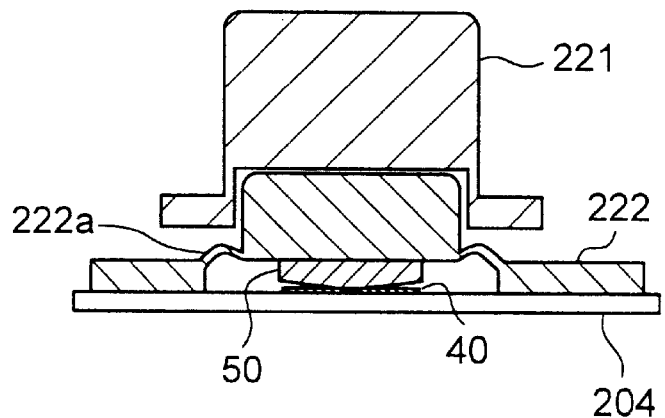
Figure 12C:
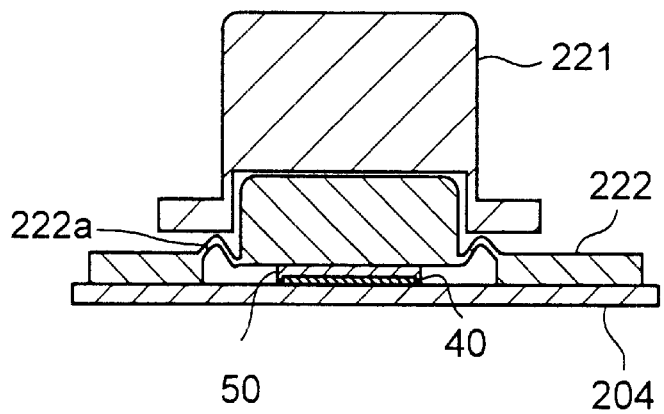

The elastic body 222 is made of insulating rubber or the like and has elastic areas 222a which protrude upward, and the lower ends of the control buttons 221 are supported upon the upper walls of the elastic areas 222a. When the control buttons 221 are pressed, the inclined-surface portions of these elastic areas 222a flex so that the upper walls move together with the control buttons 221. On the other hand, when the pushing pressure on the control buttons 221 is released, the flexed inclined-surface portions of elastic areas 222a elastically return to their original shape, pushing up the control buttons 221. The elastic body 222 functions as a spring means whereby control buttons 221 which had been pushed in by a pushing action are returned to their original positions. As shown in FIGS. 12A–12C, conducting members 50 are attached to the rear surface of the elastic body 222.

The sheet member 223 consists of a membrane or other thin sheet material which has flexibility and insulating properties. Resistors 40 are provided in appropriate locations on this sheet member 223 and these resistors 40 and conducting member 50 are each disposed such that they face one of the control buttons 221 via the elastic body 222. The resistors 40 and conducting members 50 form pressure-sensitive devices. These pressure-sensitive devices consisting of resistors 40 and conducting members 50 have resistance values that vary depending on the pushing pressure received form the control buttons 221.

To describe this in more detail, as shown in FIGS. 12A–12C, the second control part 220 is provided with control buttons 221 as control elements, an elastic body 222, conducting members 50 and resistors 40. Each conducting member 50 may be made of conductive rubber which has elasticity, for example, and has a conical shape with its center as a vertex. The conducting members 50 are adhered to the inside of the top surface of the elastic areas 222a formed in the elastic body 222.

In addition, the resistors 40 may be provided on an internal board 204, for example, opposite the conducting members 50, so that the conducting members 50 come into contact with resistors 40 together with the pushing action of the control buttons 221. The conducting member 50 deforms, depending on the pushing force on the control button 221 (namely the contact pressure with the resistor 40), so as shown in FIG. 12B and 12C, the surface area in contact with the resistor 40 varies depending on the pressure. To wit, when the pressing force on the control button 221 is weak, as shown in FIG. 12B, only the area near the conical tip of the conducting member 50 is in contact. As the pressing force on the control button 221 becomes stronger, the tip of the conducting member 50 deforms gradually so the surface area in contact expands.

Figure 13:
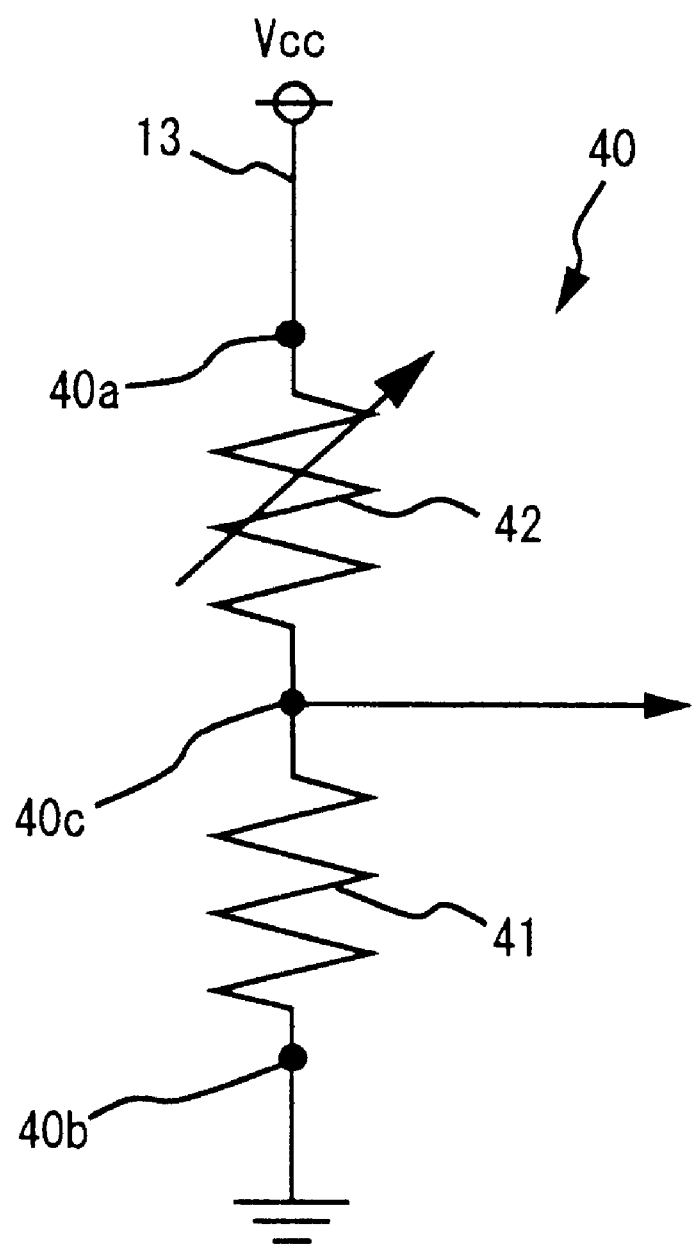
FIG. 13 is a diagram showing an equivalent circuit for a pressure-sensitive device.

FIG. 13 is a diagram showing an equivalent circuit for a pressure-sensitive device consisting of a resistor 40 and conducting member 50. As shown in this diagram, the pressure-sensitive device is inserted in series in a power supply line 13, where the voltage $V_{cc}$ is applied between the electrodes 40a and 40b. As shown in this diagram, the pressure-sensitive device is divided into a variable resistor 42 that has the relatively small resistance value of the conducting member 50, and a fixed resistor 41 that has the relatively large resistance value of the resistor 40. Among these, the portion of the variable resistor 42 is equivalent to the portion of resistance in the contact between the resistor 40 and the conducting member 50, so the resistance value of the pressure-sensitive device varies depending on the surface area of contact with the conducting member 50.

When the conducting member 50 comes into contact with the resistor 40, in the portion of contact, the conducting member 50 becomes a bridge instead of the resistor 40 and a current flows, so the resistance value becomes smaller in the portion of contact. Therefore, the greater the surface area of contact between the resistor 40 and conducting member 50, the lower the resistance value of the pressure-sensitive device becomes. In this manner, the entire pressure-sensitive device can be understood to be a variable resistor. It is noted that FIGS. 12A–12C show only the contact portion between the conducting member 50 and resistor 40 which forms the variable resistor 42 of FIG. 13, but the fixed resistor 41 of FIG. 13 is omitted from FIGS. 12A–12C.

In the preferred embodiment, an output terminal is provided near the boundary between the variable resistor 42 and fixed resistor 41, namely near the intermediate point of the resistors 40, and thus a voltage stepped down from the applied voltage $V_{cc}$ by the amount the variable resistance is extracted as an analog signal corresponding to the pushing pressure by the user on the control button 221.

First, since a voltage is applied to the resistor 40 when the power is turned on, even if the control button 221 is not pressed, a fixed analog signal (voltage) $V_{min}$ is provided as the output from the output terminal 40c. Next, even if the control button 221 is pressed, the resistance value of this resistor 40 does not change until the conducting member 50 contacts the resistor 40, so the output from the resistor 40 remains unchanged at $V_{min}$. If the control button 221 is pushed further and the conducting member 50 comes into contact with the resistor 40, the surface area of contact between the conducting member 50 and the resistor 40 increases in response to the pushing pressure on the control button 221, and thus the resistance of the resistor 40 is reduced so the analog signal (voltage) output from the output terminal 40c of the resistor 40 increases. Furthermore, the analog signal (voltage) output form the output terminal 40c of the resistor 40 reaches the maximum $V_{max}$ when the conducting member 50 is most deformed.

Figure 14:
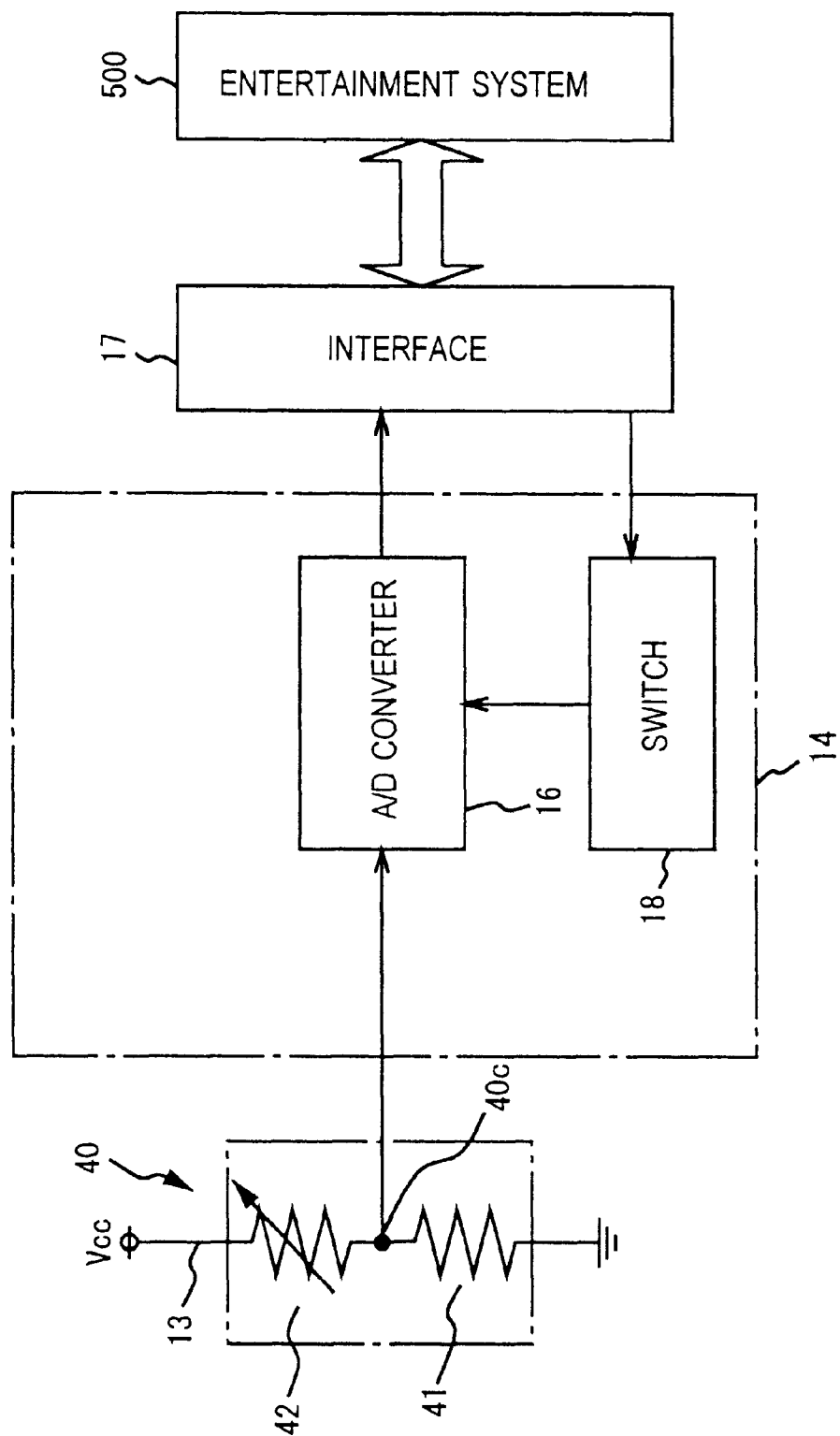
FIG. 14 is a block diagram of the main parts of the controller.

FIG. 14 is a block diagram of the main parts of the controller 200.

An MPU 14 mounted on the internal board of the controller 200 is provided with a switch 18 and an A/D converter 16. The analog signal (voltage) output from the output terminal 40c of the resistor 40 is provided as the input to the A/D converter 16 and is converted to a digital signal.

The digital signal output from the A/D converter 16 is sent via an interface 17 provided upon the internal board of the controller 200 to the entertainment system 500 and the actions of game characters and the like are executed based on this digital signal.

Changes in the level of the analog signal output from the output terminal 40c of the resistor 40 correspond to changes in the pushing pressure received form the control button 221 (control element) as described above. Therefore, the digital signal outputted from the A/D converter 16 corresponds to the pushing pressure on the control button 221 (control element) from the user. If the actions of the game characters and the like are controlled based on the digital signal that has such a relationship with the pushing pressure from the user, it is possible to achieve smoother and more analog-like action than with control based on a binary digital signal based only on zeroes and ones.

The configuration is such that the switch 18 is controlled by a control signal sent from the entertainment system 500 based on a game program recorded on an optical disc 411. When a game program recorded on optical disc is executed by the entertainment system 500, depending on the content of the game program, a control signal is provided as output to specify whether the A/D converter 16 is to function as a means of providing output of a multi-valued analog signal, or as a means of providing a binary digital signal. Based on this control signal, the switch 18 is switched to select the function of the A/D converter 16.

Figure 15:
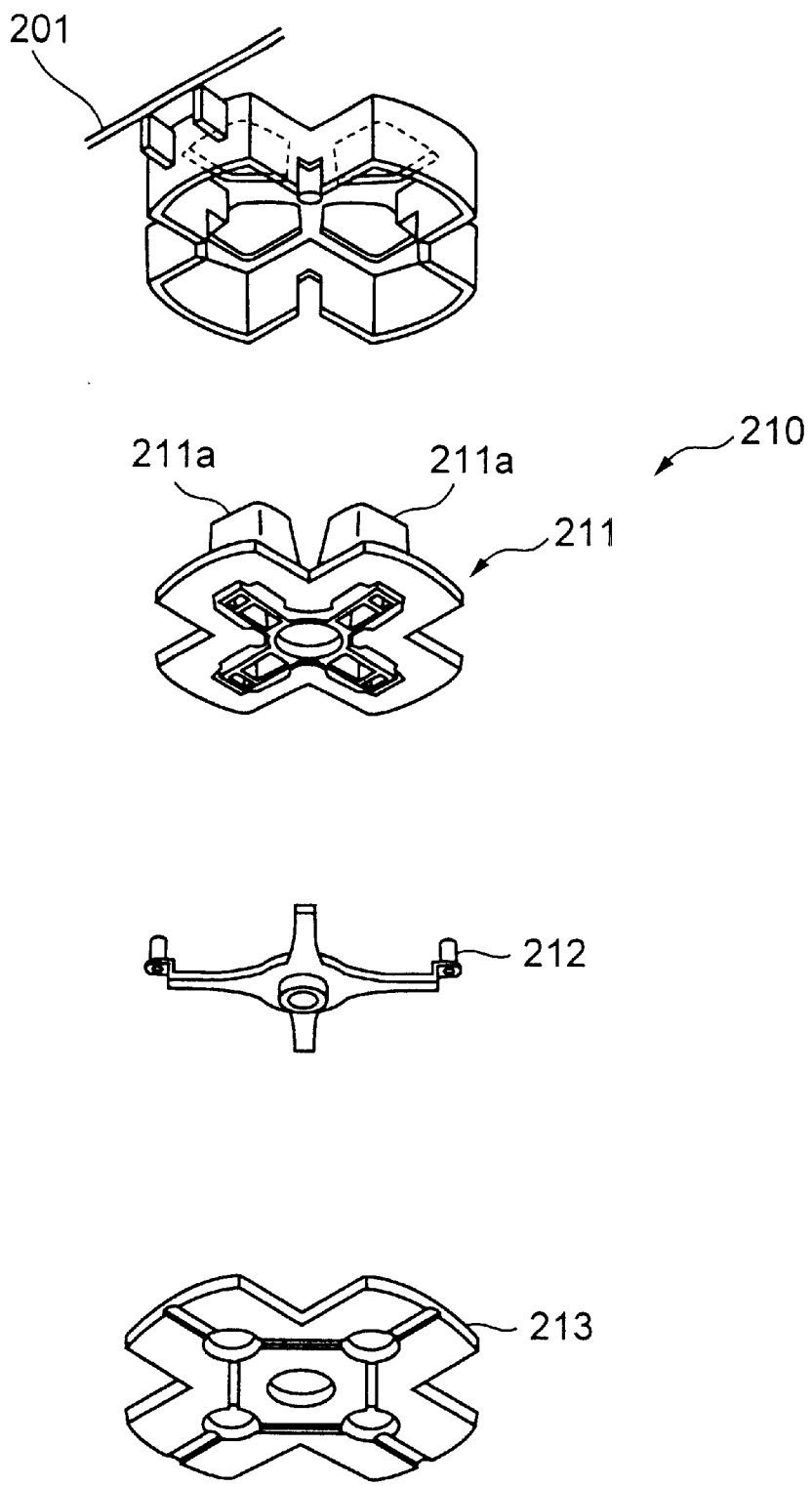
FIG. 15 is an exploded perspective view of the first control part of the controller.
Figure 16:
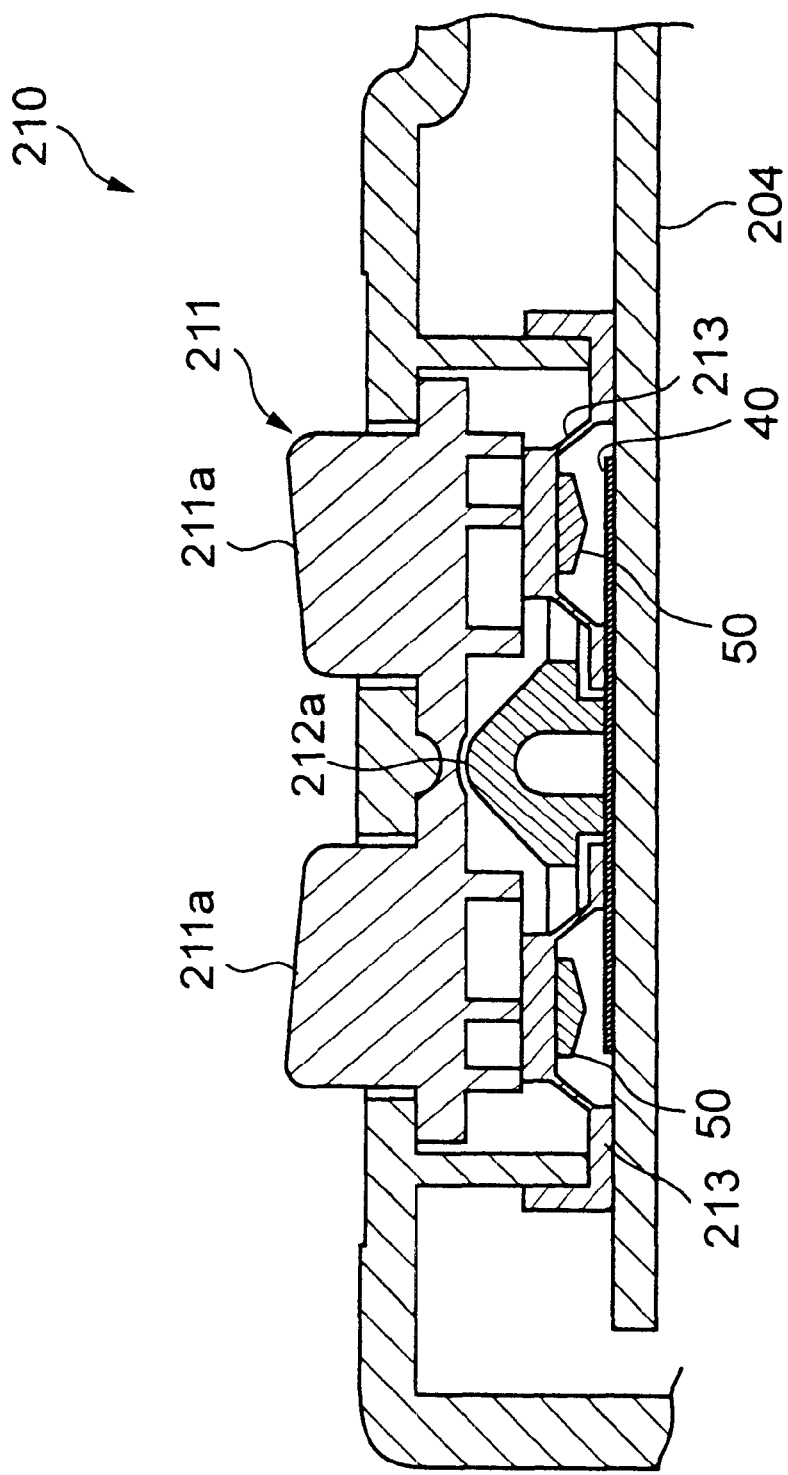
FIG. 16 is a cross sectional view of the first control part of FIG. 15.

FIGS. 15 and 16 show an example of the first control part of the controller.

As shown in FIG. 15, the first control part 210 includes a cruciform control unit 211, a spacer 212 that positions this control unit 211, and an elastic body 213 that elastically supports the control unit 211. Moreover, as shown in FIG. 16, a conducting member 50 is attached to the rear surface of the elastic body 213, and the configuration is such that resistors 40 are disposed at the positions facing the individual control keys 211a (control elements) of the control unit 211 via the elastic body 213.

The overall structure of the first control part 210 has already been made public knowledge in the publication of unexamined Japanese patent application No. JP-A-H8-163672. However, control unit 211 uses a hemispherical projection 212a formed in the center of the spacer 212 as a fulcrum, and the individual control keys 211a (control elements) are assembled such that they can push on the resistor 40 side (see FIG. 16).

Conducting members 50 are adhered to the inside of the top surface of the elastic body 213 in positions corresponding to the individual control keys 211a (control elements) of the cruciform control unit 211. In addition, the resistors 40 with a single structure are disposed such that they face the individual conducting members 50.

When the individual control keys 211a which are control elements are pushed, the pushing pressure acts via the elastic body 213 on the pressure-sensitive devices consisting of a conducting member 50 and resistor 40, so that its electrical resistance value varies depending on the magnitude of the pushing pressure.

Figure 17:
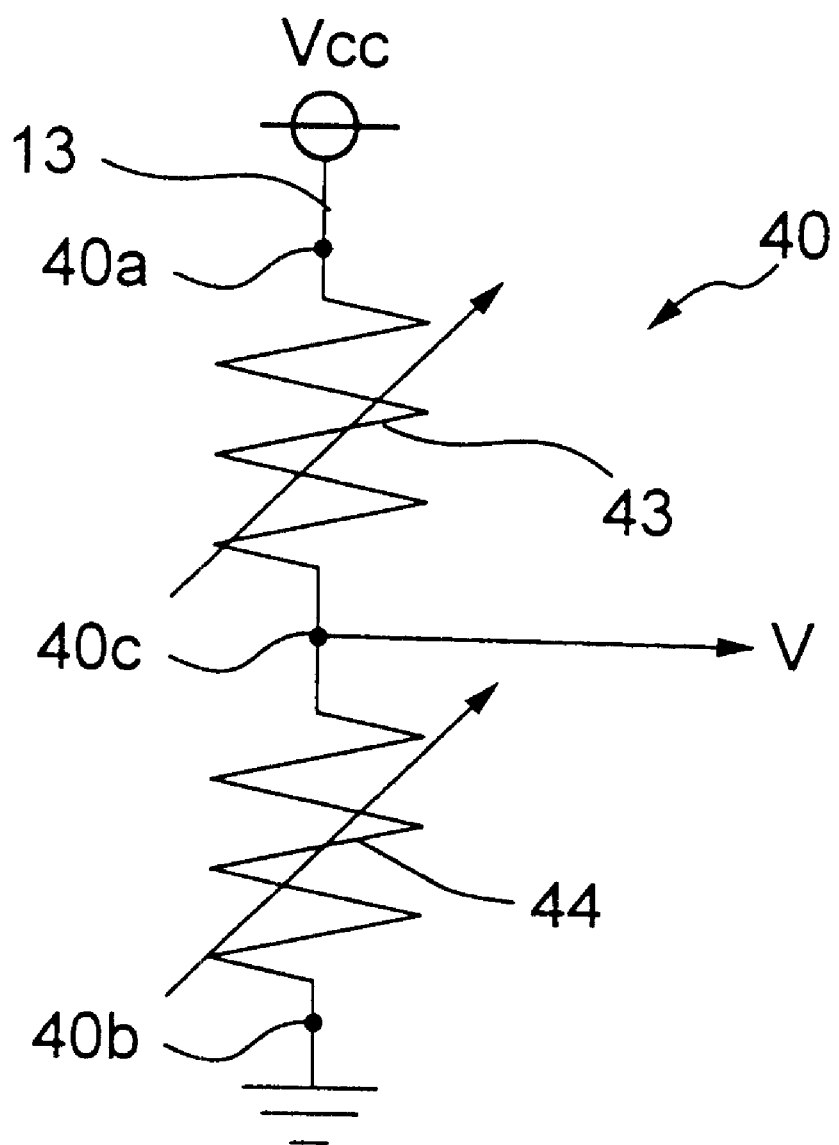
FIG. 17 is a diagram showing the circuit configuration of a resistor.

FIG. 17 is a diagram showing the circuit configuration of the resistor. As shown in this diagram, the resistor 40 is inserted in series in a power supply line 13, where a voltage is applied between the electrodes 40a and 40b. The resistance of this resistor 40 is illustrated schematically, as shown in this diagram; the resistor 40 is divided into first and second variable resistors 43 and 44. Among these, the portion of the first variable resistor 43 is in contact, respectively, with the conducting member 50 that moves together with the control key (up directional key) 211a for moving the character in the up direction, and with the conducting member 50 that moves together with the control key (left directional key) 211a for moving the character in the left direction, so its resistance value varies depending on the surface area in contact with these conducting members 50.

In addition, the portion of the second variable resistor 44 is in contact, respectively, with the conducting member 50 that moves together with the control key (down directional key) 211a for moving the character in the down direction, and with the conducting member 50 that moves together with the control key (right directional Key) 211a for moving the character in the right direction, so its resistance value varies depending on the surface area in contact with these conducting members 50.

Moreover, an output terminal 40c is provided intermediate between the variable resistors 43 and 44, and an analog signal corresponding to the pushing pressure on the individual control keys 211a (control elements) is providing as output from this output terminal 40c.

The output from the output terminal 40c can be calculated from the ratio of the split in resistance value of the first and second variable resistors 43 and 44. For example, if R1 is the resistance value of the first variable resistor 43, R2 is the resistance value of the second variable resistor 44 and $V_{cc}$ is the power supply voltage, then the output voltage V appearing at the output terminal 40c can be expressed by the following equation.

$$V = V_{cc} \times R2/(R1+R2)$$

Therefore, when the resistance value of the first variable resistor 43 decreases, the output voltage increases, but when the resistance value of the second variable resistor 44 decreases, the output voltage also decreases.

Figure 18:
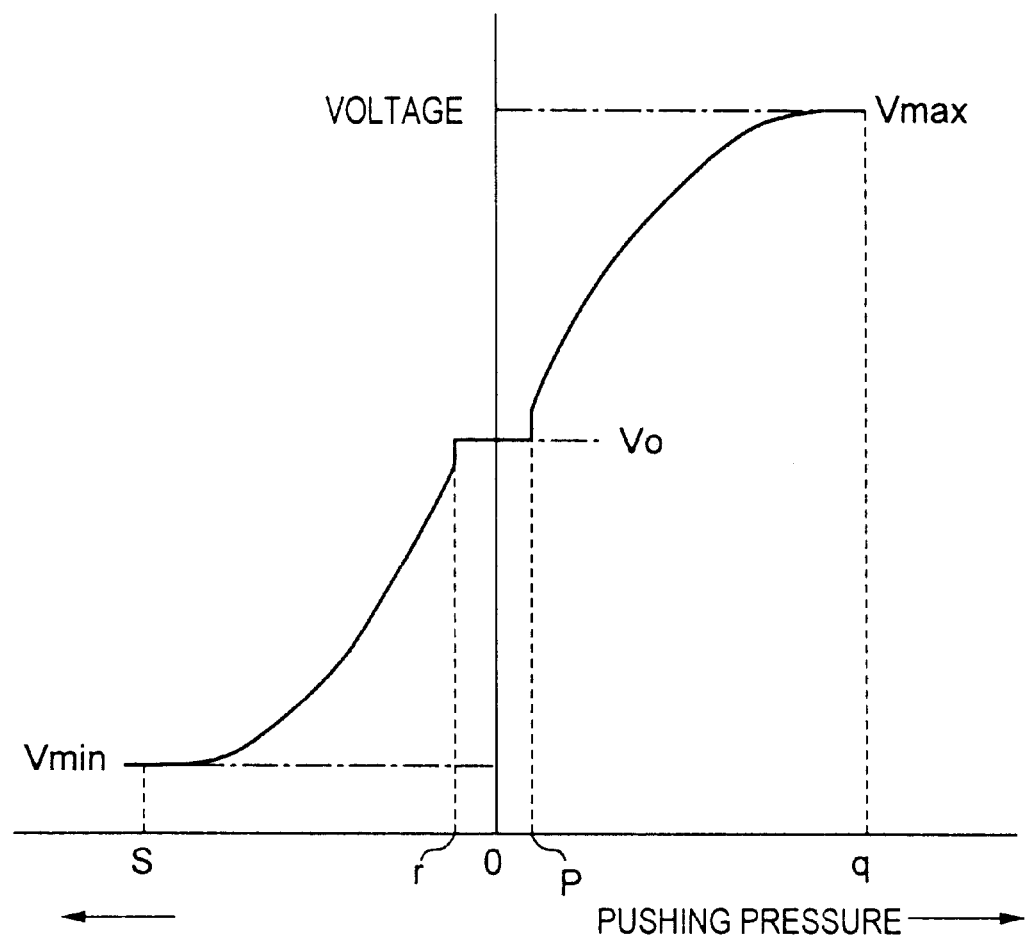
FIG. 18 is a graph showing the characteristics of a signal output.

FIG. 18 is a graph showing the characteristics of the analog signal (voltage) outputted from the output terminal of the resistor.

First, since a voltage is applied to the resistor 40 when the power is turned on, even if the individual control keys 211a of the control unit 211 are not pressed, a fixed analog signal (voltage) $V_0$ is provided as output form the output terminal 40c (at position 0 in the graph).

Next, even if one of the individual control keys 221a is pressed, the resistance value of this resistor 40 does not change until the conducting member 50 contacts the resistor 40, and the output from the resistor 40 remains unchanged at $V_0$.

Furthermore, if the up-directional key or left-directional key is pushed until the conducting member 50 comes into contact with the first variable resistor 43 portion of the resistor 40 (at position p in the graph), thereafter the surfaced area of contact between the conducting member 50 and the first variable resistor 43 portion increases in response to the pushing pressure on the control key 221a (control elements), and thus the resistance of that portion is reduced so the analog signal (voltage) output from the output terminal 40c of the resistor 40 increases. Furthermore, the analog signal (voltage) output form the output terminal 40c of the resistor 40 reaches the maximum $V_{max}$ when the conducting member 50 is most deformed (at position q in the graph).

On the other hand, if the down-directional key or right-directional key is pushed until the conducting member 50 comes into contact with the second variable resistor 44 portion of the resistor 40 (at position r in the graph), thereafter the surface area of contact between the conducting member 50 and the second variable resistor 44 portion increases in response to the pushing pressure on the control key 211a (control elements), and thus the resistance of that portion is reduced, and as a result, the analog signal (voltage) output from the output terminal 40c of the resistor 40 decreases. Furthermore, the analog signal (voltage) output form the output terminal 40c of the resistor 40 reaches the minimum $V_{min}$ when the conducting member 50 is most deformed (at position s in the graph).

Figure 19:
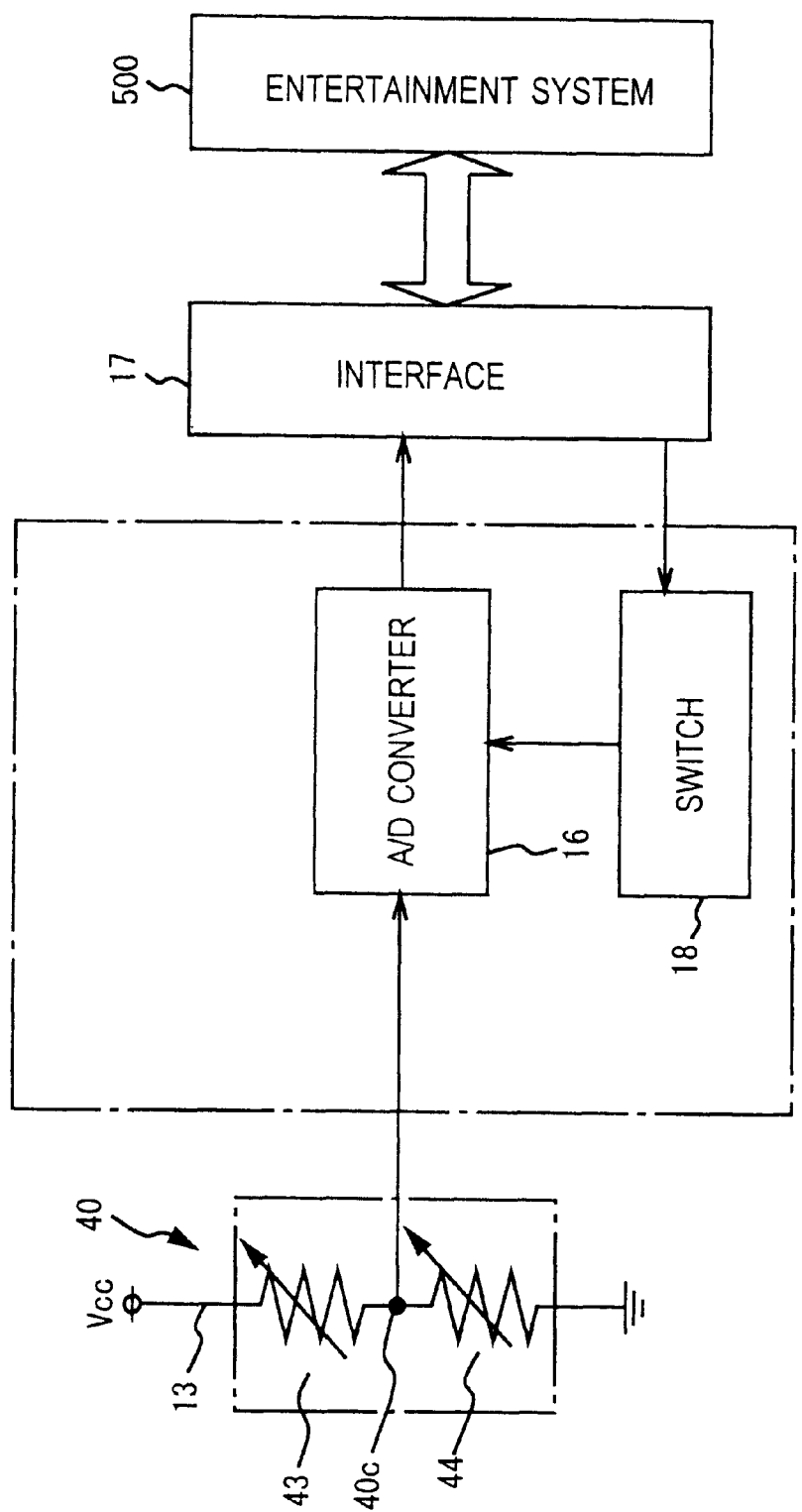
FIG. 19 is a block diagram showing the overall constitution including the resistor.

As shown in FIG. 19, the analog signal (voltage) output from the output terminal 40c of the resistor 40 is provided as input to an A/D converter 16 and converted to a digital signal. It is noted that the function of the A/D converter 16 is shown in FIG. 19 is as described previously based on FIG. 14, so a detailed description shall be omitted here.

Figure 20:
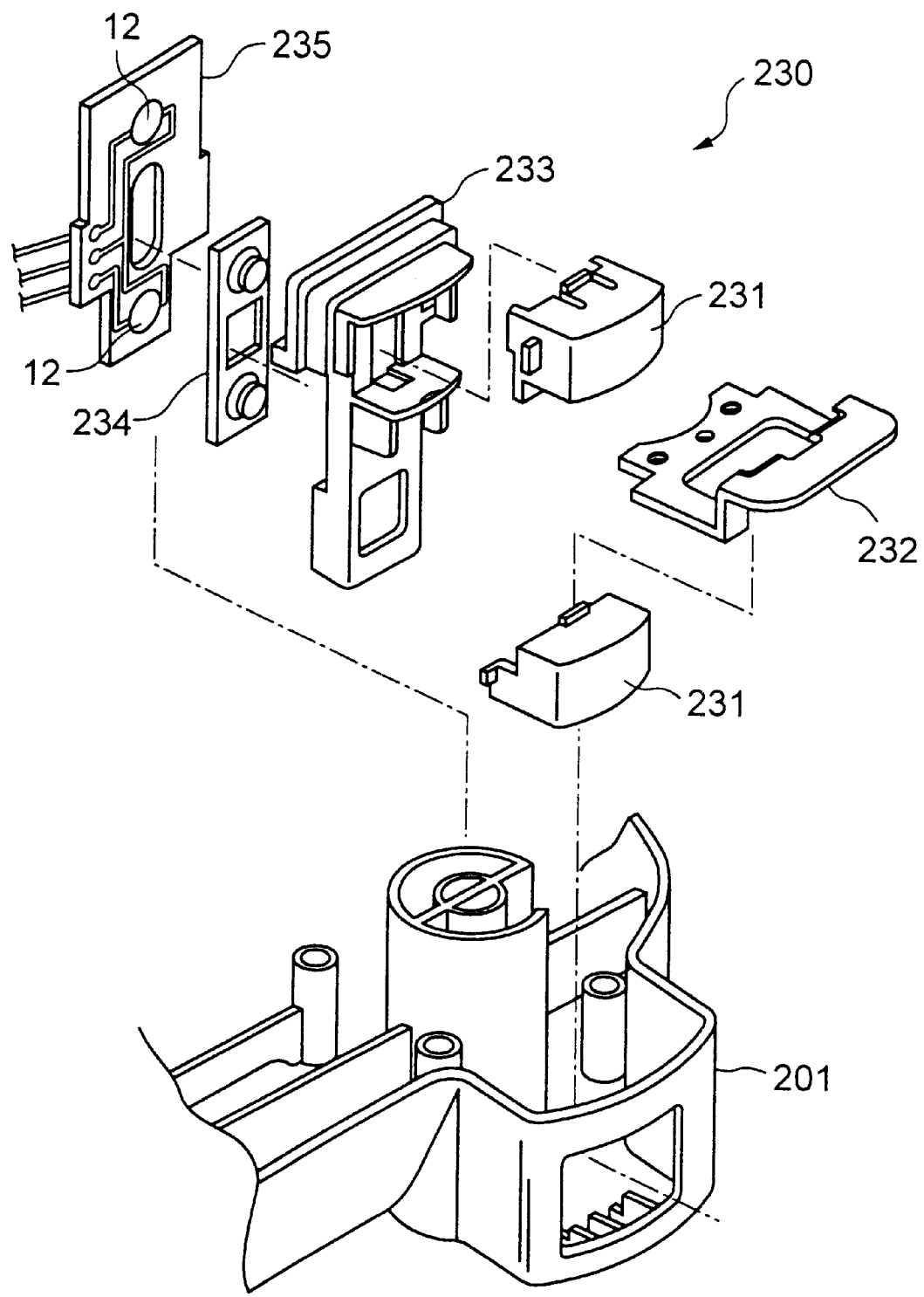
FIG. 20 is an exploded perspective view of the third control part of the controller.

FIG. 20 is an exploded perspective view of the third control part of the controller.

The third control part 230 includes two control buttons 231, a spacer 232 for positioning these control buttons 231 within the interior of the controller 200, a holder 233 that supports these control buttons 231, an elastic body 234 and an internal board 235, having a structure wherein resistors 40 are attached to appropriate locations upon the internal board 235 and conducting members 50 are attached to the rear surface of the elastic body 234.

The overall structure of the third control part 230 also already has been made public knowledge in the publication of unexamined Japanese patent application No. JP-A-H8-163672 so a detailed description thereof will be omitted. The individual control buttons 231 can be pushed in while being guided by the spacer 232, the pushing pressure when buttons 231 are pressed acts via the elastic body 234 on the pressure-sensitive device consisting of a conducting member 50 and resistor 40. The electrical resistance value of the pressure-sensitive device varies depending on the magnitude of the pushing pressure it receives.

It is noted that the fourth control part 240 has the same structure as that of the third control part 230 described above.

Within the aforementioned description, FIGS. 3 and 5 show flowcharts for performing hitting, throwing and jumping depending on pressure-sensing values, and for the processing of a horseracing game. This program may be supplied either recorded alone upon an optical disc or other recording medium, or recorded upon said recording medium together with the game software as part of the game software. This program for performing hitting, throwing, jumping and the like depending on pressure-sensing values is run by the entertainment system 500 and executed by its CPU.

Here, the meaning of supplying the program for performing hitting, throwing, jumping and the like depending on pressure-sensing values recorded individually on a recording medium has the meaning of preparing it in advance as a library for software development. As is common knowledge, at the time of developing software, writing all functions requires an enormous amount of time.

However, if the software functions are divided by the type of functions, for example, for moving objects and the like, they can be used commonly by various types of software, so more functions can be included.

To this end, a function such as that described in this preferred embodiment that can be used commonly may be provided to the software manufacturer side as a library program. When general functions like this are supplied as external programs in this manner, it is sufficient for the software manufacturers to write only the essential portions of the software.

While an embodiment was described above, the present invention may also assume the following alternative embodiments. In the embodiment, the pressure-sensing value as pushed by the user is used as is. However, in order to correct for differences in the body weights of users or differences in how good their reflexes are, it is possible to correct the maximum value of the user pressure-sensing value to the maximum game pressure-sensing value set by the program, and intermediate values may be corrected proportionally and used. This type of correction is performed by preparing a correction table. In addition, the user pressure-sensing value can be corrected based upon a known function. Moreover, the maximum value of the user pressure-sensing value rate of change may be corrected to the maximum game pressure-sensing value rate of change set in the program, and intermediate values can be proportionally corrected and used. For more details about this method, refer to the present inventors' Japanese patent application No. 2000-40257 and the corresponding PCT application JP/(Applicant's file reference No. SC0097WO00).

Due to this invention, the adjustment of hitting power or the like by means of the pushing or continuous pushing of a simple ON/OFF switch can be made an easier-to-use interface for the user.

By means of the present invention, hitting, throwing, jumping or the like is performed depending on the pressure-sensing value, so the game enjoyment can be increased and the user interface can be improved compared to the case of hitting, throwing, jumping or the like with a simple ON/OFF switch.

Moreover, by means of the present invention, for example, in this horseracing game, the horse controlled by the player runs at a speed that depends on the number of times per unit of time that the player pushes the pressure-sensitive switch and the pressure-sensing value at that time, so it is possible to provide a game that offers more of a feeling of being at a real race than the conventional horseracing games.

What is claimed is:

1. A computer which is able to execute a game program wherein characters perform stipulated actions by taking as instructions an output from a controller which has pressure-sensitive means, comprising:

means for sensing a pushing pressure of a user on the controller by said pressure-sensitive means and generating a pressure-sensing output corresponding to said pushing pressure;

means for comparing the point in time at which the maximum value of said pressure-sensing signal was generated with a standard timing for said stipulated actions determined in advance in said game program, and generating a time differential, and means for evaluating a stipulated action that a character had performed from the maximum value of said pressure-sensing signal and said time differential.

2. A method, using a computer to execute a game program wherein characters perform stipulated actions by taking as instructions an output from a controller which has pressure-sensitive means, the method comprising the steps of:

sensing a pushing pressure of a user on the controller by said pressure-sensitive means and generating a pressure-sensing output corresponding to said pushing pressure;

comparing the point in time at which the maximum value of said pressure-sensing signal was generated with a standard timing for said stipulated actions determined in advance in said game program, and generating a time differential; and evaluating a stipulated action that a character had performed from the maximum value of said pressure-sensing signal and said time differential.

* * * * *